United States Patent [19]

Neumann

[11] 4,097,649

[45] Jun. 27, 1978

[54] RESIN-IMPREGNATED SELF-ADHERING OR HEAT-SEALABLE PAPERS AND METHOD OF MAKING

[75] Inventor: Helmut Neumann, Goddelau, Germany

[73] Assignee: Röhm GmbH, Darmstadt, Germany

[21] Appl. No.: 630,328

[22] Filed: Nov. 10, 1975

[30] Foreign Application Priority Data

Nov. 16, 1974  Germany .............................. 2454496

[51] Int. Cl.$^2$ .............................................. C09J 7/04
[52] U.S. Cl. .............................. 428/327; 427/207 A; 427/207 D; 428/349; 428/355
[58] Field of Search ............... 427/207, 208, 201, 202, 427/203

[56] References Cited

U.S. PATENT DOCUMENTS

| 2,955,054 | 10/1960 | Park et al. ........................ 427/207 X |
| 3,222,211 | 12/1965 | Updegrove et al. ............ 427/207 X |
| 3,250,639 | 5/1966 | Stead ..................... 427/207 |
| 3,540,580 | 11/1970 | Columbus ........................ 427/207 X |

FOREIGN PATENT DOCUMENTS

| 699,660 | 12/1964 | Canada ............................. 427/207 A |

*Primary Examiner*—Bernard D. Pianalto
*Attorney, Agent, or Firm*—Curtis, Morris & Safford

[57] ABSTRACT

Methods for making resin-impregnated self-adhering or heat-sealable papers by impregnating a raw absorbent paper with an aqueous dispersion of a self-cross-linking resin in which the average diameter of the resin particles is less than 2 microns and, in the same or in a separate step, applying an aqueous suspension of a thermoplastic resin to the paper surface which is to be self-adhering or heat-sealable, the average diameter of the thermoplastic resin particles being over 20 microns. Self-adhering or heat-sealable papers produced by these methods.

8 Claims, No Drawings

RESIN-IMPREGNATED SELF-ADHERING OR HEAT-SEALABLE PAPERS AND METHOD OF MAKING

The present invention relates to resin-impregnated self-adhering or heat-sealable papers and to methods for making the same.

Self-adhering or heat-sealable papers, textiles, films, and the like are obtained by coating the substrate surface to be adhered with a thermoplastic resin. If the coated substrate is not absorbent, for example is a resin or metal film, the thermoplastic resin can be applied in the form of a solution and the surface becomes adherent or heat-sealable after evaporation of the solvent. On the other hand, solutions or dispersions of thermoplastic resins applied to absorbent substrates penetrate deep into the substrate, so that the amount of resin remaining on the surface is not sufficient for bonding with other materials. The solutions and dispersions can be so heavily thickened that they only penetrate partially into the substrate and, thus, a sufficient amount of resin remains on the surface. However, a simultaneous complete impregnation of the absorbent substrate with resin is, then, naturally no longer possible.

The present invention has as its object to provide papers impregnated with a heat-hardenable synthetic resin and also having a self-adhering or heat-sealable coating. If these steps are carried out one after the other, i.e., by first impregnating with a self-cross-linking resin dispersion and hardening and then coating the so-treated paper with a dispersion of an adhering or heat-sealable resin, there is not sufficient adhesion of the adhesive layer on the impregnated paper. The simultaneous treatment of raw papers with dispersions which contain both self-cross-linking and thermoplastic resins also is unsuccessful for the reasons already mentioned above. One obtains either an impregnation without a sufficiently thick resin layer on the surface or, with thickened dispersions, obtains an insufficient impregnation. Additionally, adhesion or heat-sealability is decreased when thermoplastic and self-cross-linking synthetic resins are mixed.

The object of preparing resin-impregnated self-adhering or heat-sealable papers is accomplished according to the present invention by saturating an absorbent raw paper with an aqueous dispersion of a self-cross-linking synthetic resin having a particle size of less than 2 microns, applying an aqueous suspension of a thermoplastic resin having a particle size greater than 20 microns onto that side of the paper which is to be made adhesive or heat-sealable, and drying.

The self-cross-linking synthetic resin particles of less than 2 microns in diameter penetrate into the fiber structure of the raw paper and effect a thorough impregnation. In contrast, the thermoplastic resin particles having a size of at least 20 microns are "filtered off" on the paper surface, because they are larger than the pores between the paper fibers. If both kinds of resin particles are applied from a common dispersion or suspension, the surface of the thermoplastic particles will be covered with a thin layer of the self-cross-linking particles. This can also occur by back-mixing if the resins are separately applied. Nevertheless, it has been found that this surface coating of cross-linked resin does not influence adherability or heat-sealability and, if the resin is of sufficient hardness, even has the welcome effect of rendering the surface blocking-free. On condensation of the self-cross-linking synthetic resin by heating, the thermoplastic synthetic resin particles present on the paper surface are anchored tightly to the paper.

Aqueous dispersions of self-cross-linking synthetic resins are known in the prior art for paper finishing. The resin contained therein predominantly comprises alkyl esters of acrylic acid and/or methacrylic acid having 1 to 8 carbon atoms in the alkyl ester portion, acrylonitrile, styrene, vinyl chloride, vinylidene chloride, or vinyl esters of lower carboxylic acids having 2 to 4 carbon atoms. As a rule, the resin comprises 85 to 95 percent by weight of these monomers. 5 to 15 percent by weight of the resin are one or more monomers that form the cross-linkable system. Preferred among these are N-methylolacrylamide and N-methylolmethacrylamide, and mixtures thereof with acrylamide, methacrylamide, acrylic acid, methacrylic acid, or the lower hydroxyalkyl ester of acrylic or methacrylic acid having 2 to 4 carbon atoms in the alkyl portion thereof. Commercially-available dispersions of this type have a solids content between 40 and 60 percent by weight. The particle size as a rule is far below 2 microns, namely about 0.05 – 0.2 micron. Film hardness, measured by the dynamic freezing point, $T_{\lambda max}$, as determined from the damping maximum in the torsion swing test, can be between 0° and 100° C. Dispersions forming hard films, i.e., those having a $T_{\lambda max}$-value between 40° and 60° C., are preferred. Such resins contain at least 50 percent by weight of "hard" monomers such as methylmethacrylate, styrene, vinyl chloride, or acrylonitrile. In order to adjust hardness, or, optionally, other properties such as combustibility, for example, to desired values, it can be advantageous to mix several different synthetic resin dispersions.

The synthetic resin impregnation should penetrate the paper as uniformly as possible throughout its entire thickness. The majority of the self-cross-linking dispersions employed are anionically adjusted. Their synthetic resin particles do not adhere onto the also negatively charged paper fibers and, thus, have the tendency to wander to the paper surface on drying and condensation. In this manner, the central portions of the paper layer are depleted of resin, so that the paper there is easily split. This disadvantage can be avoided by the process described in German Auslegeschrift No. 1,771,903, according to which the raw paper is pre-impregnated with polyvalent cations, for example aluminum salts or water-soluble cationic polymers. However, one can also employ cationically-charged dispersions, the synthetic resin particles of which adhere to the paper fibers without pre-impregnation. The dispersions described in German Auslegeschrift No. 2,230,985 (U.S. Ser. No. 370,239, filed June 15, 1973 and now U.S. Pat. No. 3,937,648) and German Auslegeschrift No. 2,254,781 (U.S. Ser. No. 413,416, filed Nov. 6, 1973 and now abandoned) are particularly advantageous. In these dispersions, the dispersed synthetic resin itself contains no ionogenic groups, but the emulsifier system comprises cationic and non-ionic emulsifiers.

The thermoplastic synthetic resin particles having a diameter of more than 20 microns serve as adhesives. They are not cross-linked and are not cross-linkable. They can be soft and tacky even at room temperature and thus are suitable for the preparation of self-adhering papers. If they soften or melt above room temperature, i.e., at temperatures up to about 200° C., they are suitable as heat-sealable adhesives. Suitable synthetic resins with the aforementioned properties are known. Their $T_{\lambda max}$-value is between −40° C. and 130° C. For example, they comprise from 50 to 100 percent by weight of alkyl esters of acrylic acid or methacrylic acid, vinylidene chloride, vinyl esters of carboxylic acids having 2 to 4 carbon atoms, butadiene, or mixtures of such monomers with each other. The preferred monomer components are methacrylic acid alkyl esters having 4 to 8 carbon atoms in the alkyl portion thereof, acrylic acid alkyl esters having from 1 to 8 carbon atoms in the alkyl portion thereof, and vinylidene chloride. Hardening comonomers such as methacrylic acid alkyl esters having 1 to 3 carbon atoms in the alkyl portion, styrene, or acrylonitrile can be present in the synthetic resins to influence the film hardness, but generally comprise less than 50 percent by weight, preferably less than 30 percent by weight, of the synthetic resin.

Polymers in a suitable molecular weight range are obtained in a known fashion by the use of chain transfer agents, particularly mercaptans. Thermoplastic resin particles of the desired size can be prepared directly by suspension or pearl polymerization and then have a particle size of 0.02 to 1 mm, preferably 0.2 to 0.5 mm. It is suitable to employ these polymers directly in the aqueous phase in which they are prepared, as is described in German Pat. No. 2,135,828 (U.S. Pat. No. 3,870,557, granted Mar. 11, 1975) for suspension polymers having a softening temperature of less than 35° C. Suspension polymers of greater $T_{\lambda max}$-values can be prepared in a corresponding manner and used in the aforementioned process. Naturally, one can also use isolated pearl polymers and prepare an aqueous suspension thereof.

Thermoplastic synthetic resins prepared in the form of dispersions have a particle size which is too small for the process of the invention. However, they can be brought to the desired particle size of more than 20 microns by agglomeration. For this purpose, a coagulant is gradually added to a synthetic resin dispersion containing no more than 40 percent of solids until a visible flocking occurs. For anionic dispersions, polycationic compounds are suitable as coagulants, for example water-soluble calcium-, magnesium-, or aluminum-salts, or water-soluble cationic polymers such as cationic aminoplast resin-precondensates, polyethylene imine, and polymers of salts or of quaternization products of aminoalkyl esters of acrylic acid or methacrylic acid or of vinyl imidazole. The necessary amount of coagulant depends on its efficacy in the particular dispersion and can be very different from case to case. For a uniform coagulation to particles of a predominantly uniform size, good stirring and very slow and careful addition of the coagulant at the lowest possible temperature are important.

The raw papers used in the process of the invention have surface weights of 100 − 200 grams/m² and, as a rule, comprise only cellulose. However, they may also contain up to 20 percent of synthetic resins. In most cases, they are colored or printed.

The process according to the invention can be carried out as a one-step or as a two-step process. In the two-step method, the raw paper, which may optionally contain a polycationic precipitating agent, is impregnated with the self-cross-linking synthetic resin dispersion. The dispersion is adjusted to a solids content of 30 − 45 percent and can, if desired, additionally contain a water-soluble aminoplast (urea and/or melamine-formaldehyde) resin. A rapid and complete impregnation is achieved if the paper is led through a trough filled with the dispersion and is then squeezed to the desired resin uptake. The dispersion can also be applied to the paper surface and uniformly distributed thereover with a doctor blade or air brush. The resin uptake should be at least 50 percent, preferably from 80 − 150 percent, of the paper weight (all calculated on dry weight).

The impregnated paper train is then coated with the aqueous suspension of the thermoplastic resin, either without drying or after partial drying, in a second process step. The coating suitably is done with a doctor blade, air brush, or roller applicator. About 5 g to 100 g of the thermoplastic resin is applied per square meter of the paper surface. The resin content and the viscosity of the suspension are adjusted so that the required amount of synthetic resin is applied by the application technique which is employed.

The addition of a self-cross-linking synthetic resin dispersion can be advantageous to improve freedom from blocking. The handling properties of the papers prepared according to the present invention may be further improved by small additions of phenol resin particles which harden under heat-sealing conditions.

After the application of the synthetic resin suspension, the paper train is led through a drying and condensation zone. In this process, the side of the paper train having the adhesive or heat-sealable coating may not be touched. It is advantageous, although not always possible, to maintain the drying- and condensation-temperature under the heat sealing temperature of the synthetic resin, for example at 100° to 120° C.

In the one-step procedure, the heat-hardenable dispersion and the thermoplastic synthetic resin suspension are mixed and applied to one side of the paper with a doctor blade or air brush. The miscibility of the components should be tested in preliminary tests, since not all components which can be used according to the invention are compatible with each other. Thus, for example, anionically and cationically emulsified dispersions precipitate each other. Salts of polyacrylic acid, used as a thickening agent, coagulate cationic dispersions. Precoagulated dispersions used as the thermoplastic component are, as a rule, not usable in the one-step process since the self-cross-linking dispersions would similarly be precipitated. In order to insure a thorough impregnation, the viscosity of the mixture should not be adjusted to too high a value. Condensation and drying are carried out as described above.

Self-adhering papers prepared according to the process of the invention can be adhered directly after drying to a train of paper or non-woven fabric, to a textile, or to a metal- or synthetic resin-film using paired rolls. In contrast, a dried train of a paper provided with a heat-sealable coating can, after sufficient cooling, be directly rolled up without blocking. These papers can be heat-sealed to fiberboard, plywood, and similar carrier sheets at temperatures of 140° to 160° C. and under a pressure of 3 to 5 kilograms/cm². Pressure is applied for 30 to 60 seconds. The paper surface can, simultaneously with heat sealing, be brought to a high shine by the use of a shine plate if, in addition to the self-cross-linking resin, a thermoplastic dispersed resin is used in amounts of from 10 − 50 percent, based on the total resin content of the dispersion, according to the process described in German Auslegeschrift No. 2,135,072.

A better understanding of the present invention and of its many advantages will be had by referring to the following specific Examples, given by way of illustration.

EXAMPLE 1

An absorbent raw paper is impregnated with a mixture comprising 50 kg of a 60 percent self-cross-linking acrylic resin dispersion which forms films having a $T_{\lambda max}$-value (according to DIN 53 445) of 3° C., 50 kg of a water-soluble aminoplast resin (Commercially available as "Kaurit-Traenkharz 210"), 5 kg of water, and 0.1 kg of a phosphoric acid hardening catalyst. The self-cross-linking acrylic resin comprises 92 percent by weight of ethyl acrylate, 5 percent by weight of N-methylolmethacrylamide, and 3 percent by weight of methacrylamide. The particle size is about 0.2 micron.

The excess of the impregnating agent is squeezed off so that the resin uptake is from 80 to 100 percent by weight of the dry weight of the paper.

A slurry of 80 kg of a pearl polymer of butyl acrylate and methyl methacrylate having a glass transition temperature ($T_g$) of 18° C., in 20 kg of an aqueous solution of hydroxyethyl cellulose, is applied with a doctor blade on the back side of the still moist paper in an amount such that 40 g of the pearl polymer is applied to 1 square meter. The pearl polymer has a particle size of 100 microns and comprises 55 percent by weight of butyl acrylate and 45 percent by weight of methylmethacrylate.

The paper is subsequently dried at 130° C., during which drying the pearl polymer layer may not be touched. The paper obtained is heat-sealable at 140° - 180° C.

EXAMPLE 2

The process according to Example 1 is repeated using, for the coating applied to the back side of the paper, a mixture of 80 kg of the aformentioned pearl polymer, 40 kg of water, and 40 kg of a 60 percent dispersion of a thermoplastic acrylic acid resin which forms films having a $T_{\lambda max}$-value (according to DIN 53 445) of 16° C. The added thermoplastic acrylic resin comprises 56 percent by weight of butyl acrylate and 44 percent by weight of methylmethacrylate and has a particle size of 0.2 micron.

The pearl polymer particles are bound more tightly to the paper than in Example 1.

EXAMPLE 3

The procedure according to Example 1 is repeated using, for the coating for the back side of the paper, a mixture of 100 kg of a 60 percent dispersion of a thermoplastic, anionically stabilized, acrylic acid resin as in Example 2 [$T_{\lambda max}$-value (according to DIN 53 445) of 16° C.], 150 kg of water, and 10 kg of a water-soluble cationic modified melamine-formaldehyde condensation resin (commercially available as "Madurit MV 160"). The synthetic resin contained in the dispersion coagulates in the mixture to little flocks having an average diameter of 40 microns. The paper obtained is heat-sealable at 100° - 150° C.

EXAMPLE 4

An absorbent raw paper is coated on the back side with a mixture of:

30 kg of a 60 percent self-cross-linking acrylic resin dispersion as in Example 1;
70 kg of a 60 percent anionically stabilized thermoplastic acrylic resin dispersion as in Example 2;
12 kg of water;
100 kg of a water-soluble aminoplast resin (commercially available as "Kaurit-Traenkharz 420"); and
0.2 kg of an acid hardening catalyst (phosphoric acid).

A portion of the synthetic resin in the thermoplastic dispersion coagulates to form little flocks of an average of about 40 microns in diameter. These flocks are held on the paper surface while the remaining portions penetrate into the paper and produce a weak impregnation. The coated paper is dried at 130° C. and is heat-sealable at 140° - 180° C.

EXAMPLES 5 - 13

An absorbent paper is impregnated with a 50 percent self-cross-linking synthetic resin dispersion A and the excess of the impregnating agent is squeezed off to an extent such that the resin uptake after drying is 80 - 100 percent of the paper weight.

After squeezing, but before drying, a suspension of 40 g of a pearl polymer, in the form of an 80 percent suspension in water and slightly thickened with hydroxyethyl cellulose, is applied, per square meter of paper surface, with a doctor blade to the back-side of the impregnated paper. Subsequently, the paper is dried at 130° C. without touching of the coated side.

These Examples are summarized below.

| Ex. | Composition of Dispersion A (% by Weight) | Composition of Pearl Polymer B (% by Weight) |
|---|---|---|
| 5 | 59% methylacrylate<br>20% acrylonitrile<br>15% butylacrylate<br>4% MMAA<br>2% methacrylamide<br>$T_{\lambda max} = 50°$ C.<br>d = 0.2 micron | 50% butylmethacrylate<br>50% methylmethacrylate<br><br><br><br>$T_{\lambda max} = 95°$ C.<br>d = 35 microns |
| 6 | 42% butylacrylate<br>25% methylmethacrylate<br>25% styrene<br>4% MMAA<br>3% methacrylamide<br>1% glycoldimethacrylate<br>$T_{\lambda max} = 45°$ C.<br>d = 0.2 micron | 75% ethylacrylate<br>15% methylmethacrylate<br>10% methacrylic acid<br><br><br><br>$T_g = 20°$ C.<br>d = 50 microns |
| 7 | 60% vinylidene chloride<br>25% butylacrylate<br>10% methylmethacrylate<br>2.5% MMAA<br>2.5% acrylamide<br>$T_{\lambda max} = 30°$ C.<br>d = 0.15 micron | 50% vinylidene chloride<br>50% styrene<br><br><br><br>$T_g = 40°$ C.<br>d = 100 microns |
| 8 | 46% ethylacrylate<br>47% methylmethacrylate<br>5% MMAA<br>2% methacrylic acid<br>$T_{\lambda max} = 50°$ C.<br>d = 0.25 micron | 75% butylmethacrylate<br>25% styrene<br><br><br>$T_g = 40°$ C.<br>d = 250 microns |
| 9 | 98% vinyl acetate<br>2% N-methylolacrylamide<br>$T_{\lambda max} = 35°$ C.<br>d = 0.4 micron | 60% ethylacrylate<br>40% ethylmethacrylate<br>$T_{\lambda max} = 42°$ C.<br>d = 70 microns |
| 10 | 77% butylacrylate<br>20% methylmethacrylate<br>2% MMAA<br>1% acrylic acid<br>$T_{\lambda max} = -16°$ C.<br>d = 0.2 micron | 65% vinylidene chloride<br>35% ethylacrylate<br><br><br>$T_g = -20°$ C.<br>d = 100 microns |
| 11 | as in Example 10 | 100% 2-ethyl-hexyl-acrylate<br>$T_g = -50°$ C.<br>d = 150 microns |
| 12 | as in Example 10 | 80% ethylacrylate<br>20% acrylonitrile<br>$T_{\lambda max} = 10°$ C.<br>d = 500 microns |
| 13 | as in Example 10 | 80% butylacrylate<br>20% vinyl acetate<br>$T_g = -38°$ C. |

-continued

| Ex. | Composition of Dispersion A (% by Weight) | Composition of Pearl Polymer B (% by Weight) |
|---|---|---|
| | | d = 120 microns |

MMAA = N-methylol-methacrylamide
$T_{\lambda max}$ = dynamic freezing point in ° C.
$T_g$ = glass transition temperature in ° C. (as defined by W. A. Lee and G. J. Knight in Brandrup-Immergut "Polymer Handbook" 1966, p. III 61 – 62)
d = average particle size diameter In Examples 5 – 9, heat-sealable papers are formed. The papers according to Examples 10 – 13 are self-adhering at room temperature.

What is claimed is:

1. A method for making a synthetic resin-impregnated self-adhering or heat-sealable paper which comprises saturating an absorbent paper with an aqueous dispersion of a self-cross-linking synthetic resin, in which dispersion the resin particles have an average particle size of less than 2 microns, and, without drying, applying an aqueous suspension of a thermoplastic resin, in which suspension the resin particles have an average particle size of over 20 microns, to that side of the paper which is to be self-adhering or heat-sealable, and then drying said paper.

2. A method as in claim 1 wherein said thermoplastic resin particles having a particle size of over 20 microns are a pearl polymer.

3. A method as in claim 1 wherein said thermoplastic resin particles having a particle size of over 20 microns are aggregated particles.

4. A method as in claim 1 wherein said paper is first saturated with said aqueous dispersion of a self-cross-linking resin and the aqueous suspension of a thermoplastic resin is subsequently applied.

5. A method as in claim 1 wherein said aqueous dispersion of a self-cross-linking resin additionally contains particles, less than 2 microns in average diameter, of a thermoplastic synthetic resin.

6. A method as in claim 4 wherein said aqueous suspension of thermoplastic resin additionally contains particles, less than 2 microns in average diameter, of a self-cross-linking synthetic resin.

7. A method as in claim 1 wherein said paper is concurrently saturated with said dispersion of a self-cross-linking synthetic resin and provided on one side thereof with a coating of said thermoplastic resin, which method comprises applying, to that side of the paper to be provided with a self-adhering or heat-sealable coating, an aqueous suspension containing both particles of a self-cross-linking synthetic resin, which particles have an average diameter less than 2 microns, and particles of a thermoplastic synthetic resin, which latter particles have an average diameter of over 20 microns.

8. A self-adhering or heat-sealable paper prepared by the method of claim 1.

* * * * *